(12) United States Patent
Ashley et al.

(10) Patent No.: US 7,646,829 B2
(45) Date of Patent: Jan. 12, 2010

(54) COMPOSITE DATA DETECTOR AND A METHOD FOR DETECTING DATA

(75) Inventors: Jonathan James Ashley, Los Gatos, CA (US); Harley F. Burger, Jr., Sunnyvale, CA (US)

(73) Assignee: Agere Systems, Inc., Allentown, PA (US)

( * ) Notice: Subject to any disclaimer, the term of this patent is extended or adjusted under 35 U.S.C. 154(b) by 531 days.

(21) Appl. No.: 11/021,019

(22) Filed: Dec. 23, 2004

(65) Prior Publication Data

US 2006/0140311 A1    Jun. 29, 2006

(51) Int. Cl.
*H04L 27/06* (2006.01)
(52) U.S. Cl. .................. 375/340; 375/341; 375/324; 375/316
(58) Field of Classification Search .......... 375/341, 375/340, 324, 316
See application file for complete search history.

(56) References Cited

U.S. PATENT DOCUMENTS

| | | | |
|---|---|---|---|
| 5,577,053 A * | 11/1996 | Dent | 714/755 |
| 5,771,248 A * | 6/1998 | Katayama et al. | 714/763 |
| 6,069,856 A * | 5/2000 | Mita et al. | 369/47.19 |
| 6,084,926 A * | 7/2000 | Zak et al. | 375/341 |
| 6,215,744 B1 * | 4/2001 | Mita et al. | 369/47.24 |
| 6,381,726 B1 * | 4/2002 | Weng | 714/780 |
| 6,606,724 B1 * | 8/2003 | Krieger et al. | 714/755 |
| 6,622,277 B1 * | 9/2003 | Ramanujam et al. | 714/755 |
| 6,708,308 B2 * | 3/2004 | De Souza et al. | 714/795 |
| 7,085,992 B2 * | 8/2006 | Becker et al. | 714/795 |
| 7,096,411 B2 * | 8/2006 | Cherubini et al. | 714/791 |
| 7,113,555 B2 * | 9/2006 | Campello de Souza et al. | 375/341 |
| 7,418,644 B2 * | 8/2008 | Smith et al. | 714/755 |
| 2001/0019522 A1 * | 9/2001 | Mita et al. | 369/47.19 |
| 2002/0166091 A1 * | 11/2002 | Kidorf et al. | 714/752 |
| 2003/0101410 A1 * | 5/2003 | Betti et al. | 714/794 |

OTHER PUBLICATIONS

Mita, Seiichi et al.; "A PRML and EPRML Spliced Operation Scheme Designed to Reduce Power Dissipation of Read Channel Chips"; Journal Article; Jan. 1998; pp. 153-159; vol. 34, No. 1; IEEE Transactions on Magnetics; USA.

* cited by examiner

*Primary Examiner*—Shuwang Liu
*Assistant Examiner*—Kenneth Lam
(74) *Attorney, Agent, or Firm*—Daniel J. Santos; John M. Harman (57) ABSTRACT

A composite data detector having first and second data detectors. The second detector of the invention starts in a known state and only runs as long as is necessary before being switched off and handing control back over to the smaller detector. Therefore, the composite data detector of the invention consumes less power than the known composite data detector and estimates bits with higher accuracy.

20 Claims, 8 Drawing Sheets

TOP: SHUTDOWN IS NOT INDICATED

FIG. 4B

BOTTOM: SHUTDOWN IS INDICATED

COMPOSITE DATA DETECTOR AND A METHOD FOR DETECTING DATA

FIELD OF THE INVENTION

The invention relates generally to the field of data detectors, and more particularly, to a composite data detector having a first data detector that runs continuously and a second detector that runs only when the confidence associated with an estimate made by the first detector is low. The composite data detector of the invention has relatively low power consumption and improved accuracy compared to existing composite data detectors.

BACKGROUND OF THE INVENTION

Digital communications systems and digital storage systems (e.g., hard disk drives) are similar from the perspective of extracting the original (transmitted or stored) bits from the received signal or from the readback signal. In the case of communication channels, the digital information is transferred from one location to another location, but at the same time (perhaps with a small transmission delay), whereas in storage channels, the information is transferred from one time to a later time, but at the same location. The goal in both cases is to retrieve the original bits as accurately as possible in the presence of impairments such as noise and inter-symbol interference (ISI). Data detectors are used to detect the retrieved bits and determine whether each bit corresponds to a binary 1 or to a binary 0.

A recurring problem with existing data detectors is that they generally consume a large amount of power to achieve adequate performance, which, in turn, generates a large amount of heat. Typically, the chip package that contains the data detector is not designed to handle the excess heat caused by the large amount of power consumed. Although standard data detectors that consume less power exist, they generally sacrifice performance in order to save power.

One approach that minimizes power consumption without sacrificing performance involves using a composite data detector. A composite detector is a data detector that combines a first, relatively small data detector, and a second, relatively large and more accurate data detector. However, known composite detectors have several drawbacks, including poor efficiency. For example, one known composite detector has a smaller detector that runs continuously for an entire read event and then triggers a larger, and more accurate detector, which starts in an unknown state and has a fixed runtime of a minimum of 60 cycles after being triggered by the smaller detector. The minimum runtime of the larger detector causes it to run more often than necessary, which wastes power. Moreover, the larger detector is initiated based on path metric differences, which may not always be accurate. In the case where the larger detector is a parity-doubled Viterbi detector, no provision is made to resynchronize the larger detector in the correct parity state, which results in errors.

Accordingly, it would be desirable to provide a composite data detector that consumes a relatively small amount of power compared to known composite data detectors and that operates with greater accuracy than known composite data detectors.

SUMMARY OF THE INVENTION

The present invention provides a composite data detector for detecting data and a method for detecting data. The composite data detector comprises a first data detector and a second data detector. The first data detector receives a sequence of bits and the second data detector receives the same sequence of bits a predetermined delay period after the first data detector receives the sequence of bits. The first data detector is configured to generate hard bit estimates as to whether each bit in the sequence corresponds to a 1 or a 0 and to generate a respective confidence factor associated with each hard bit estimate. Each confidence factor indicates whether or not the respective hard bit estimate is reliable. The second data detector receives the hard bit estimates and the confidence factors generated by the first data detector. The second data detector is configured to process unreliable hard bit estimates in accordance with a branch metrics processing algorithm to generate new hard bit estimates that are reliable.

In accordance with the method of the invention, a sequence of bits is received in a first data detector. Hard bit estimates as to whether each bit in the sequence corresponds to a 1 or a 0 and respective confidence factors are then generated in the first data detector. Each confidence factor indicates whether or not the respective hard bit estimate is reliable. The same sequence of bits is received in the second data detector a predetermined delay period after the first data detector receives the sequence of bits. The hard bit estimates and the confidence factors generated by the first data detector are also received in the second data detector. When at least one of the confidence factors indicates that at least one respective hard bit estimate generated by the first data detector is unreliable, the second data detector is turned on. Unreliable hard bit estimates are processed in the second data detector in accordance with a branch metrics processing algorithm to generate new hard bit estimates that are reliable. When either the second data detector has generated new hard bit estimates for any unreliable bit estimates received by the second data detector or the second data detector determines that one or more confidence factors received by the second data detector indicate that one or more respective hard bit estimates generated by the first data detector are reliable, the second detector turns off.

In accordance with another embodiment of the invention, the second data detector is initialized to a known state prior to processing the bit sequence received in the second detector to generate new, reliable hard bit estimates. By initializing the second data detector to this known state, the reliability of the new hard bit estimates is improved, thereby improving the overall accuracy of the composite detector as well as reducing the period of time the second detector is on.

These and other features and advantages of the invention will become apparent from the following description, drawings and claims.

DETAILED DESCRIPTION OF EXEMPLARY EMBODIMENTS

In accordance with the present invention, a composite data detector is provided that estimates bits with very high precision and which is very efficient in terms of power consumption. In contrast to the known composite data detector, which has a second detector that starts in an unknown state after being triggered by the smaller detector and has a fixed runtime of a minimum of 60 cycles, the second detector of the invention starts in a known state and only runs as long as is necessary before being switched off and handing control back over to the smaller detector. Therefore, the composite data detector of the invention consumes less power than the known composite data detector and estimates bits with higher accuracy. The composite data detector of the invention in accordance with exemplary embodiments will now be described with reference to FIGS. 1-10.

Figure 1:
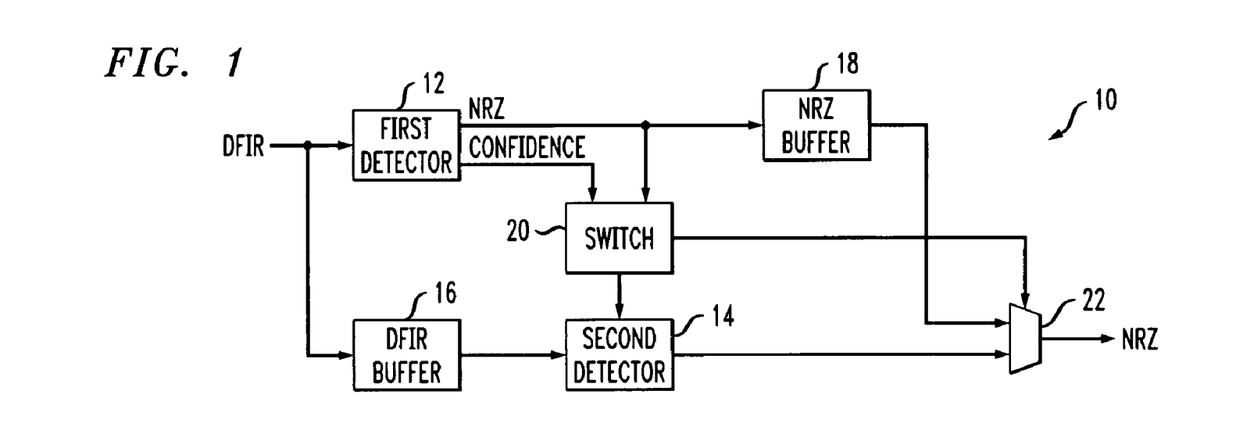
FIG. 1 illustrates a block diagram of a composite detector system, having first and second full rate data detectors, according to an exemplary embodiment of the present invention.

FIG. 1 illustrates a block diagram of an example of the composite data detector 10 of the present invention. The composite data detector 10 includes a first data detector 12 and a second data detector 14. The first data detector 12 is typically smaller and consumes less power than the second data detector 14. The second data detector 14 is typically larger and more accurate than the first data detector 12 in the sense that second detector 14 has more logic gates than the first detector 12 that enable the second data detector 14 to make more accurate estimates and thus commit fewer errors than the first data detector 12.

Preferably, the first data detector 12 runs continuously for an entire read event and receives an equalized signal that is typically the output of a digital finite impulse response ("DFIR") filter. The first detector 12 preferably is a soft-output Viterbi algorithm detector (SOVA) that produces both a soft output (i.e., confidence estimates) and a hard output (i.e., a binary 1 or 0). The first detector 12 may be any detector that produces both a soft and a hard output. Thus, the first detector 12 produces both a stream of data estimates (i.e., binary 1 or binary 0 bits), as well as a stream of corresponding confidence levels (or confidence estimates).

Preferably, the second detector 14 runs only when the confidence in the estimates made by the first detector is relatively low as gauged by confidence estimates produced by the first detector 12. The confidence estimates output by the first detector 12 are used to determine whether to turn on and off the second detector 14. In exemplary embodiments, the second detector 14 is a hard output Viterbi detector having branch metrics that are more accurate than the branch metrics of the first detector 12. However, it should be noted that the second detector 14 may be a soft-output detector or a hard output detector. In the exemplary embodiment, the second detector 14 is a data dependent, bias-compensated, single-parity hard output Viterbi detector. Additionally, the second detector 14 has functionality that enables it to be dynamically switched on in a known state, and switched off when it has computed just enough bit estimates to replace the unreliable estimates made by the first detector 12. Thus, the second detector 14 preferably runs for a period of time that is no longer than necessary to recompute the low confidence bits output by the first detector 12. Starting the second detector 14 in a known state and running it only as needed conserves power.

The composite data detector 10 preferably also includes a DFIR buffer 16, a non-return-to-zero (NRZ) buffer 18, switching logic 20, and a multiplexer 22. The DFIR buffer 16 delays the input to the second detector 14 for enough time so that the reliability information (i.e., the confidence estimates) from the first detector 12, which controls whether the second detector 14 is switched on or off, arrives early enough for the second detector 14 to re-use the same DFIR samples used by the first detector 12 to produce the low confidence bit estimate. The NRZ buffer 18 delays the NRZ output from the first detector 12, which is then fed to the multiplexer 22. The multiplexer 22 receives inputs from the first detector 12, the second detector 14, and the switching logic 20 and selects the second detector 14 bit estimate for those bits for which the second detector 14 has recomputed a bit estimate, and otherwise selects the first detector 12 bit estimate.

As described herein, the exemplary embodiment uses two taps of stationary noise prediction on a length 3 target, which gives 8 states in the first detector 12. This has been done to keep the number of states small and to keep the branch metrics simple. Those skilled in the art will understand that data detectors can have any number of states and that the invention is not limited to a detector that has any particular number of states.

Figure 2:
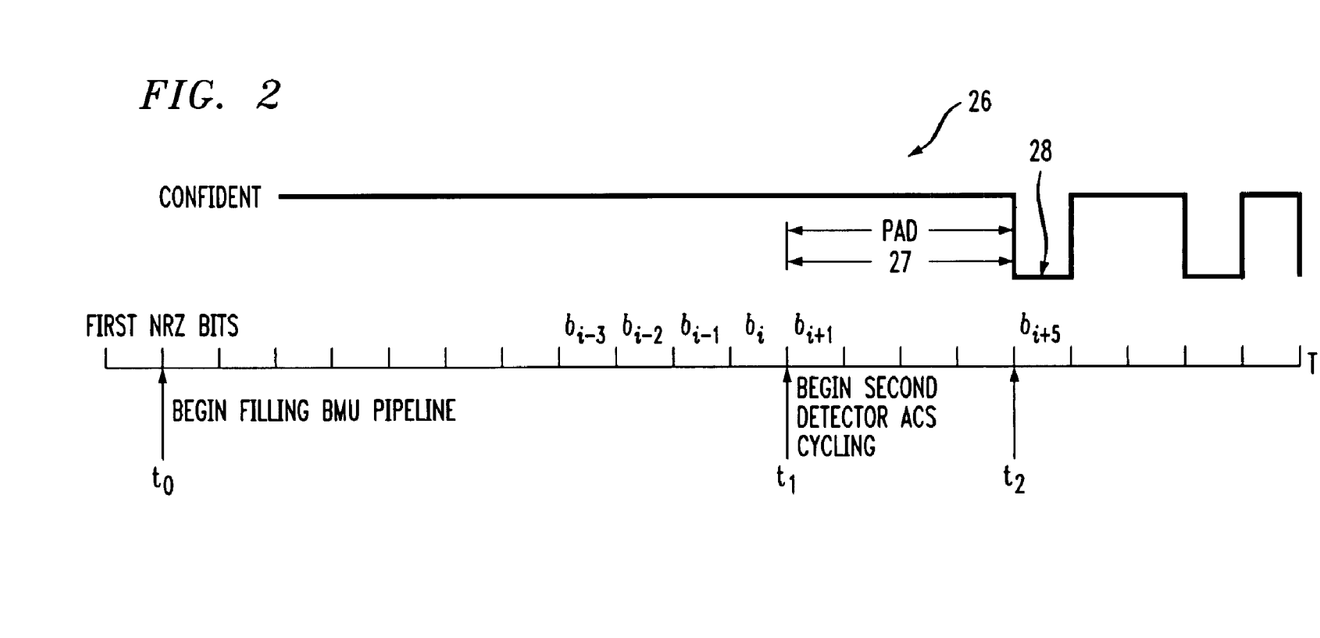
FIG. 2 illustrates a timeline that demonstrates when the second detector shown in FIG. 1 is turned on relative to the cycling of the second detector.

When the second detector 14 is turned on, the switching logic 20 initializes the state of the second detector 14 to a state that is based on a block of reliable bit estimates output by the first detector 12. FIG. 2 illustrates a plot 26 that demonstrates the use of a block of bit estimates used to initialize the state of the second detector 14. A long enough sequence of DFIR output samples is buffered in the DFIR buffer 16 so that the branch metric unit ("BMU") pipeline can begin to fill up at time $t_0$ prior to starting an add/compare/select (ACS) cycle at time $t_1$, which creates a preset anticipation 27 ("pad" in FIG. 2) before the first low-confidence bit estimate occurs, which occurs at cycle i+5 (or $t_2$) in FIG. 2. At time $t_2$, the confidence signal goes low, as indicated by arrow 28.

In FIG. 2, "$b_i$" represents the NRZ bit estimate of the first detector 12 at cycle i. In the situation shown in FIG. 2, the second detector 14 is initialized to a state consisting of NRZ memory bits:

$b_{i-3}b_{i-2}b_{i-1}b_i$.

In the parity case, the initial state is:

$(b_{i-3}b_{i-2}b_{i-1}b_i,p)$ and the parity, p, is determined based on the high confidence, i.e., reliable, bit estimates as $$p = \sum_{j=i-L}^{i} b_j,$$

where $$b_{i-L} \ldots b_{i-1} b_i$$

is an initial segment of a parity codeword, "L" is the length of the initial segment of a codeword, and $b_{i-L}$ is the first bit of the parity codeword. This initial state in this example is enforced by 5 full-rate cycles of pruning (and, preferably, is enforced by nothing more than this). During the first 5 full-rate ACS cycles of operation of the second detector 14, the comparisons are all preferably completely "rigged" in that each comparison has a foreordained outcome. In each of the first four of these cycles, with index i+j, where $1 \leq j \leq 4$, the winning branch (i.e., the unpruned branch) at each state:

$$d_{i+j-3} d_{i+j-2} d_{i+j-1} d_{i+j}$$

in the path memory has an initial state of $$b_{i+j-4} d_{i+j-3} d_{i+j-2} d_{i+j-1}$$

in the path memory. In the last of these five initial cycles (the cycle at index i+5), the winning branch (or unpruned branch) at the state $$(d_{i+2} d_{i+3} d_{i+4} d_{i+5}, q)$$

has an initial state of $$(d_{i+1} d_{i+2} d_{i+3} d_{i+4}, q+d_{i+5})$$

where the initial bit $d_{i+1}$ satisfies $$d_{i+1} = p + q + \sum_{j=2}^{5} d_{i+j}$$

The variables "d" and "q" represent general bits (unlike the specific bits "b" that are the path memory bits $b_{i-3} b_{i-2} b_{i-1} b_i$) and the parity of the state $(d_{i+2} d_{i+3} d_{i+4} d_{i+5})$ (unlike "p" which is the parity of the initial state), respectively.

Figure 3:
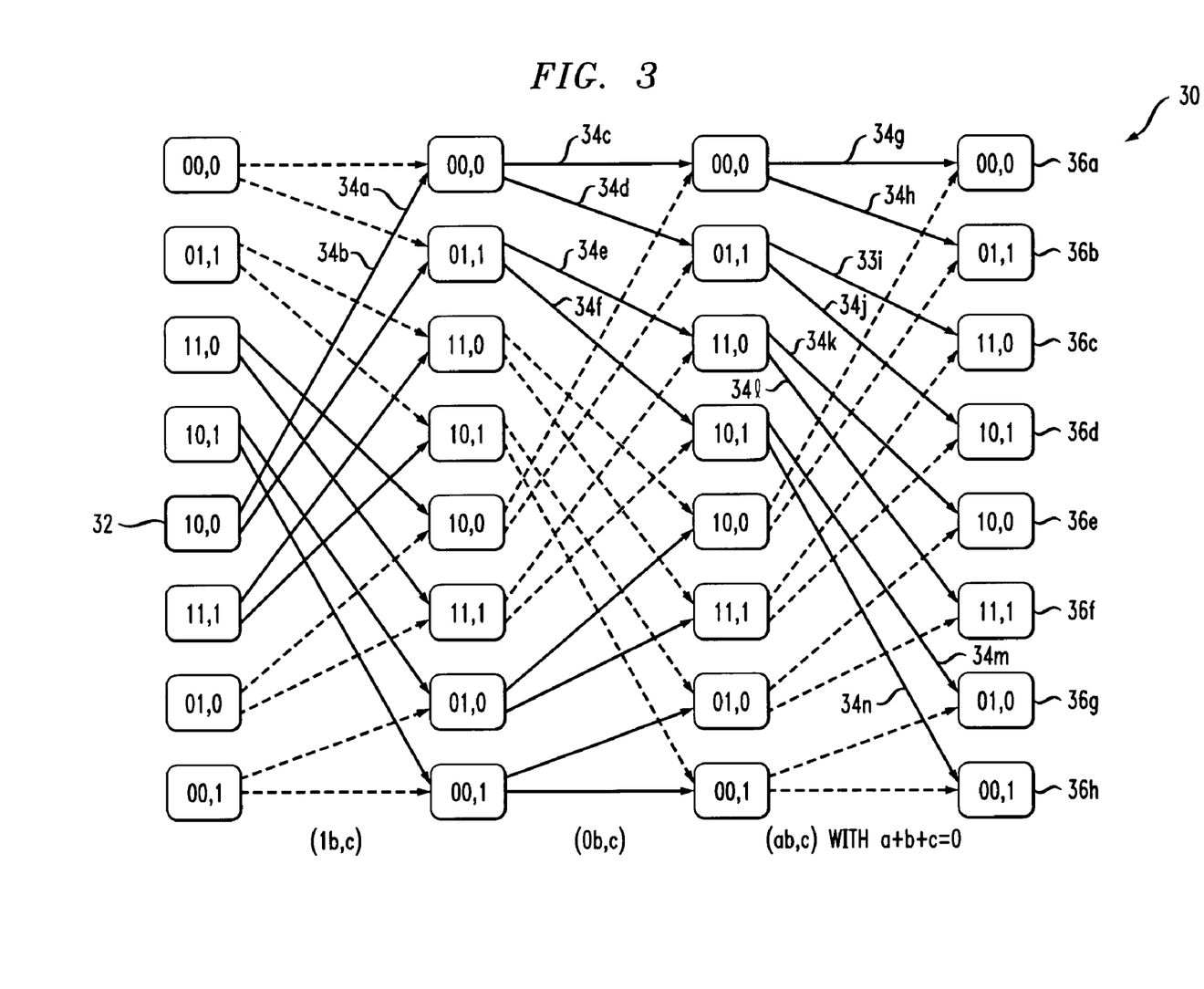
FIG. 3 illustrates an eight-state trellis used to prune NRZ estimates from the first detector shown in FIG. 1 to force the second detector shown in FIG. 1 to an initial state when the NRZ memory of each state is 2 bits and there is one parity bit.

The second detector 14 includes logic that is controlled by the switching logic 20 for pruning the add/compare/select decisions so as to force an initial state of the second detector 14. FIG. 3 illustrates a trellis diagram 30 that demonstrates this initial pruning. For ease of illustration and discussion, the trellis diagram 30 shown in FIG. 3 is for the case where there are two path memory bits in each state, rather than 4 bits as described with respect to FIG. 2, and one parity bit. Therefore, for the trellis 30 shown in FIG. 3, there are 3 rounds of initial pruning to force an initial state in the second detector 14 (rather than 5 rounds as would be the case where there are 4 path memory bits in each state). In the example shown, the initial state is state (10, 0), as shown in block 32. The pruned branches correspond to the dotted arrows shown in FIG. 3 and the unpruned branches correspond to the bold arrows shown in FIG. 3. The first round of pruning leaves the branches with initial states of the form (1b, c). The second round leaves the branches with initial states of the form (0b, c). The third round leaves the branches with initial states of the form (ab, c), where a+b+c is the parity of the state (10, 0), i.e., a+b+c=0.

Thus, tracing the unpruned branches 34a through 34n from right to left starting at states 36a through 36h shows that all unpruned paths of length 3 start at state (10, 0), which is shown in block 32 and which corresponds to the forced initial state of the second detector 14. Those skilled in the art will understand how to prune for an initial state when there are other numbers of path memory bits in each state. For example, from the example described above with reference to FIG. 3, it can be seen that in the case where there are 4 path memory bits and one parity bit in each state, there will be thirty-two states and five rounds of pruning.

The initial pruning algorithm described above is consistent with pruning for parity in the second detector 14, which, as stated above, preferably is a hard output Viterbi detector. In fact, the initial pruning is at least as severe as parity pruning in the sense that any path remaining after the last of the initial pruning cycles would also remain after the parity pruning cycle if it were to be done at the time of any of the initial pruning cycles. (This relies on the fact that the reliable bit estimates output by the first detector 12 are used to establish parity, as described above). As a consequence, if initial pruning occurs in a cycle that would ordinarily be a parity pruning cycle, then the parity pruning in that cycle can be disabled. To prune for parity in such a cycle would be redundant. This remains true even in a half-rate implementation (i.e., processing two bits at a time as compared to full rate processing of one bit at a time). In other words, the fact that this initial pruning algorithm is not inconsistent with parity pruning remains true even in a half-rate implementation.

A shutdown algorithm is designed to turn off the second detector 14 as soon as its path memory has merged to the point that it contains unambiguous (merged) bit estimates for all low confidence bits up to the current equalized sample plus a pad. As a consequence, all unmerged bits in the second detector path memory are high confidence bits. The path memory, which is part of the second detector 14, is not shown in the figures. In general, the path memory includes one buffer for each state of the second detector (the buffer is also referred to as a row). Each buffer stores a sequence of bits at lags (delays) 0 up to some maximum lag, L. This sequence of bits is known by those skilled in the art as the "survivor path" for the state. A bit at delay j in the buffer (row) corresponding to state k at cycle i is denoted as $b_i^{[j,k]}$. The sequence of bits in the buffer (row) corresponding to state k is the most likely sequence of bits that ends at state k. The condition where all unmerged bits in the second detector path memory are high confidence bits will be referred to herein as the merged-or-confident condition.

Figure 4A:
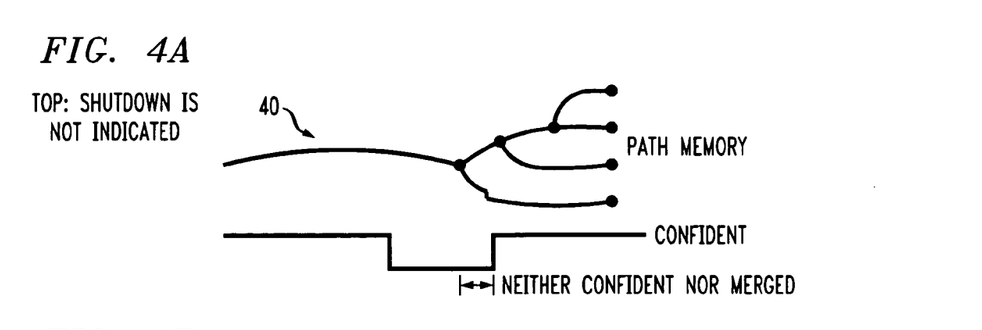
FIG. 4A illustrates a graphical representation of the path memory of the second detector shown in FIG. 1 when some bits in the path memory are neither merged nor confident.
Figure 4B:
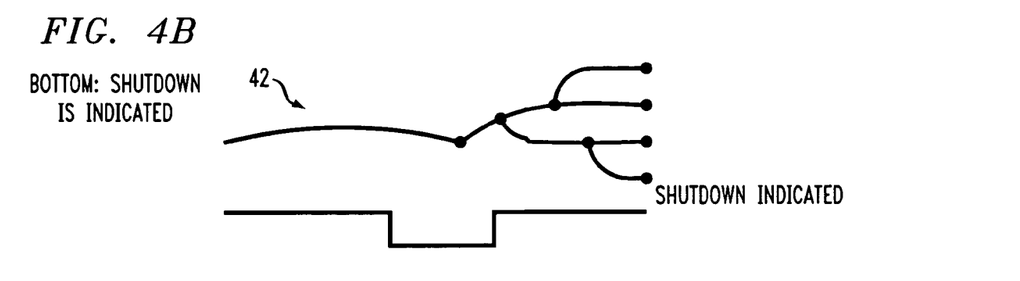
FIG. 4B illustrates a graphical representation of the path memory of the second detector shown in FIG. 1 when all bits in the path memory are either merged or confident.

FIGS. 4A and 4B depict a graphical representation of four states of the second detector 14. Each state has a row of path memory associated with it. Therefore, there are four rows of the sequence of bit values of the path memory that this figure conveys. In FIG. 4A, the plot 40 shows that some bits are neither merged nor confident; thus, the second detector 14 will not yet turn off. However, in FIG. 4B, all bits are either merged or confident. Thus, in the case illustrated in FIG. 4B, the shutdown signal goes high (and the plot 42 shows that the merged bits cover the low confidence bits). Therefore, to turn off the second detector 14, either the bits are high confidence bits or the bits are merged.

Figure 5:
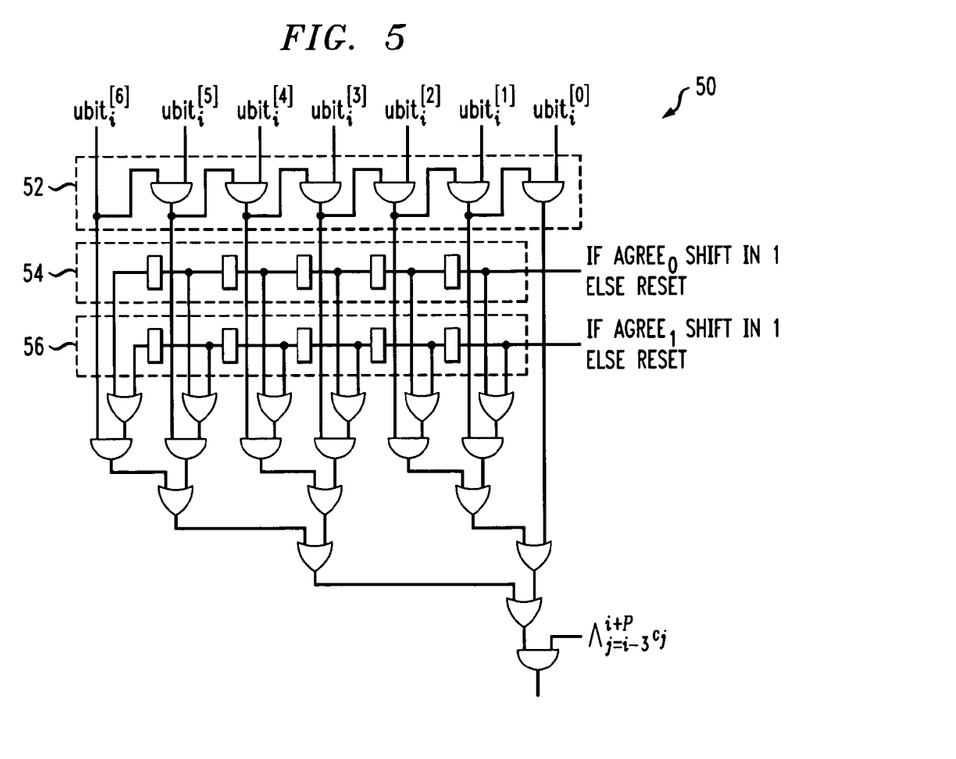
FIG. 5 illustrates a schematic diagram of a circuit for shutting down the second detector shown in FIG. 1 when the bits in the path memory are either merged or confident.
Figure 6:
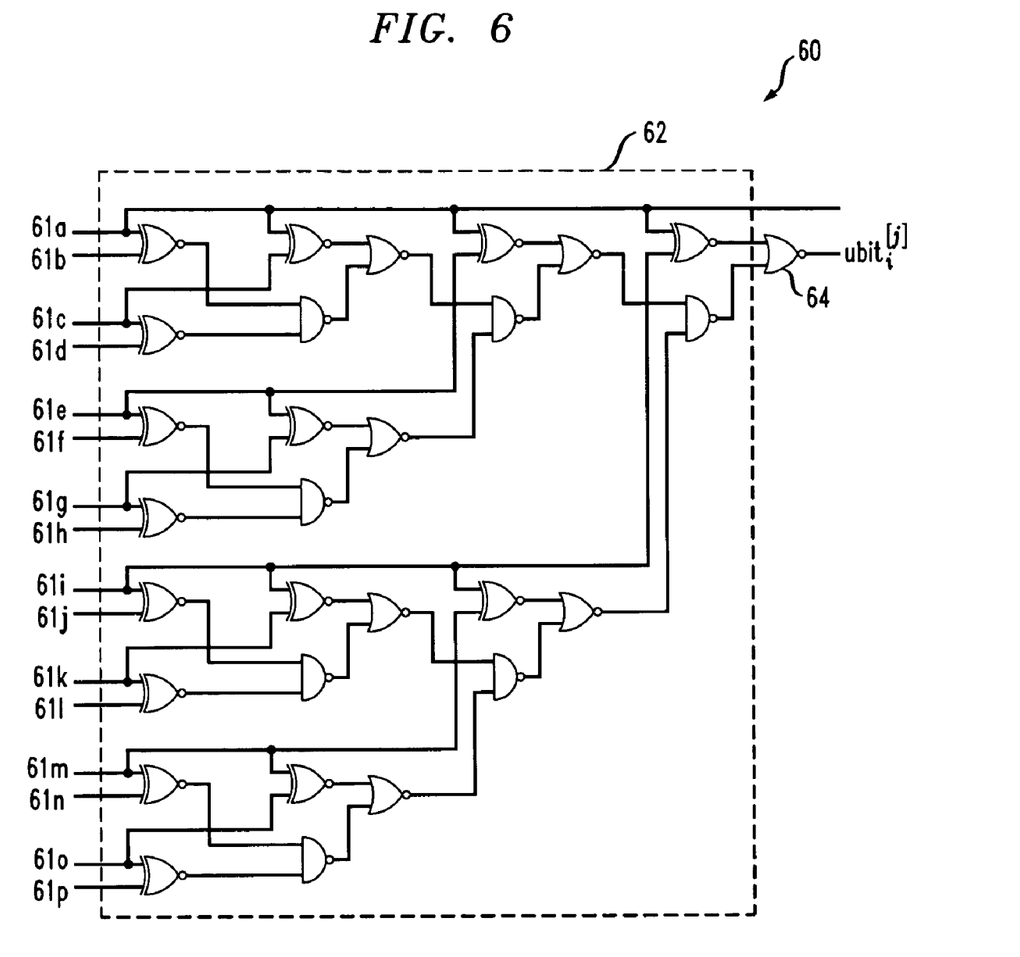
FIG. 6 illustrates a schematic diagram of a circuit for determining the top row of input values for circuit shown in FIG. 5.

In the case of parity doubling in the second detector 14 for parity detection, the bit estimates output by the first detector 12 preferably agree, bit-for-bit, with the bit estimates produced in the second detector 14 along the entire unmerged stretch of some survivor path in the second detector 14. The final state of this survivor path is one or the other of the two parity versions of the states whose path memory is determined by the first detector 12 bit estimate. This condition can be referred to as the unmerged-path-agreement condition. FIG. 5 depicts an exemplary circuit 50 that calculates the shutdown indicator signal for the second detector 14 for a path memory of length 7 bits. The indicator signal is the signal that causes the second detector 14 to shut down when both the merged-or-confident condition and the unmerged-path-agreement condition hold. In the case where the second detector 14 is not parity-doubled, the circuit 50 shown in FIG. 5 can be simplified so as to include only one delay line rather than two. In this case, the indicator signal only asserts that the merged-or-confident condition holds. An exemplary circuit 60 for computing the input signal $ubit_i^{[j]}$ for the circuit 50 shown in FIG. 5, in the case of 16 states, is depicted in FIG. 6. The signal $ubit_i^{[j]}$ indicates that the corresponding column of the path memory at delay j contains a unique bit value. The inputs 61a through 61p to the circuit 60 are the bits in a particular column of the path memory, and in this exemplary embodiment, there are sixteen inputs because the second detector 14 has sixteen states. The inputs 61a through 61p to the circuit 60 are compared to one another by the various gates of the logic 62. The result of the comparisons performed by logic 62 generate a ubit output at NOR gate 64 that is 1 if all inputs are 0 or if all inputs are 1, and 0 otherwise. With reference again to the circuit 50 shown in FIG. 5, the output from the k-th AND gate from the left in the upper row 52 of AND gates is 1 if and only if the signals $ubit_i^{[6]}, ubit_i^{[6-1]}, \ldots ubit_i^{[6-k]}$ are all 1. Therefore, the outputs from these AND gates 52 are either all 0, or there is some position m ("m" meaning merge) for which the outputs are all 1 at or to the left of m and 0 to the right of m. It follows that the shutdown indicator signal becomes 1 whenever either delay line 54 or 56 contains a 1 at or to the left of position m, or when the path memory is entirely merged (m=0), and all of the bits $b_{i-3}, b_{i-2} \ldots, b_{i+P}$ are confident. Here, the letter P represents the pad length corresponding to the switch cycle latency plus the number of bit cycles in anticipation of a low confidence bit that will cause the second detector 14 to be initialized and to begin the ACS cycling. The two delay lines 54 and 56 record the extent of each of the two possible matches of a second detector path with the first detector bit estimate. The two paths correspond to the two possible parities in the case that the second detector 14 had parity-doubling.

Figure 7:
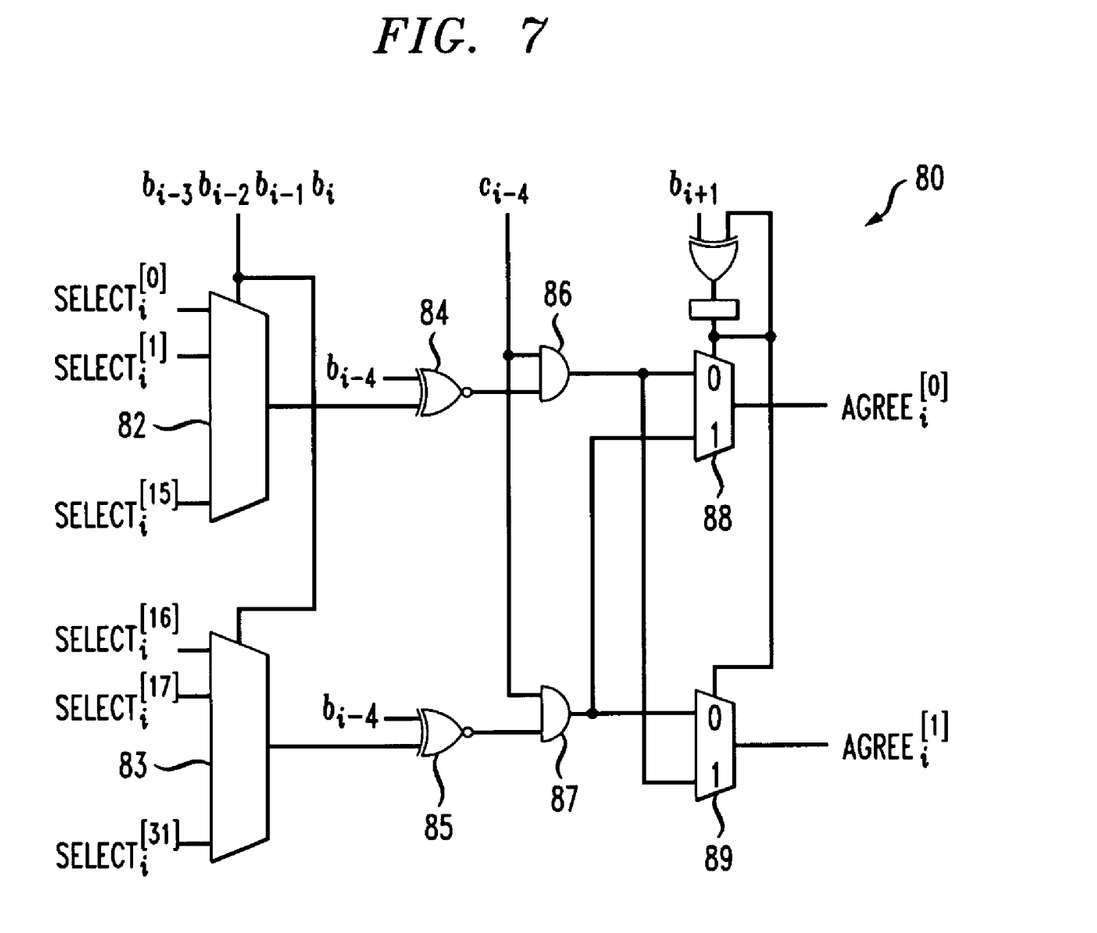
FIG. 7 illustrates a schematic diagram of a circuit for controlling the update of two agreement delay lines shown in FIG. 5.

The circuit shown in FIG. 7 controls the update of the two agreement delay lines 54 and 56 shown in FIG. 5. The two signals $agree_i^{[0]}$ and $agree_i^{[1]}$ shown in FIG. 7 are computed from the select signals $select_i^{[j]}$ produced by the second detector 14 during the ACS cycle, and from the block of first detector 12 bit estimates $b_{1-4}b_{i-3}b_{i-2}b_{i-1}b_i$. The bit estimates are aligned with the select signals in the multiplexers 82 and 83 so that the Viterbi input used to compute branch metrics for the ACS cycle that produces the select signal $select_i^{[j]}$ at state j ideally depends on bits $b_{i-2}b_{i-1}b_i$. In other words, the last four bits $b_{i-3}b_{i-2}b_{i-1}b_i$ determine the path memory of the state j at which the ACS select signal $select_i^{[j]}$ is equal to $b_{i-4}$ in the case that the select signal agrees with the first detector 12 bit estimate. Additionally, the select signals $select_i^{[j]}$ can reflect any pruning for parity that might occur during cycle i.

It follows that the output of the top NXOR gate 84 is 1 if and only if the select decision at the state with path memory $b_{i-3}b_{i-2}b_{i-1}b_i$ and parity 0 agrees with the first detector estimate $b_{i-4}$. Similarly, the output of the bottom NXOR gate 85 is 1 if and only if the select decision at the state with path memory $b_{i-3}b_{i-2}b_{i-1}b_i$ and parity 1 agrees with the first detector 12 estimate $b_{i-4}$. These two signals are ANDed by AND gates 86 and 87 with the confidence signal $c_{i-4}$, which indicates whether or not the bit estimate $b_{i-4}$ is confident. The two results are swapped by MUXes 88 and 89, or not, according to whether the accumulated parity $\Sigma_{j=0}^{i} b_j$ of the first detector 12 bit estimate is 1 or 0.

This permutation maintains a consistent correspondence between each of two (parity opposite) trellis paths in the second detector 14 and the two agreement delay lines 54 and 56 in the shutdown indicator circuit 50. If the results are not swapped here, then the contents of the delay lines 54 and 56 can be swapped, although the latter may not be preferable because it would be more costly to implement. Swapping applies to the case where the second detector 14 has parity doubling. In such case, each of the two agreement delay lines 54 and 56 includes a block of 1's at its upstream end. The length of the block of 1's in delay line 54 is the length of the match of the first detector bit estimate with one of two parity-opposite survivor paths in the second detector 14. In other words, the length of the block of 1's is the length of the match of the first detector bit estimate with one of the two bit sequences stored in the two rows of the path memory corresponding to the two parity-opposite Viterbi states whose path memory both match the most recent bits of the first detector 12 bit estimate.

The length of the block of 1's in the other delay line 56 is the length of the match of the first detector 12 bit estimate with the other of the two parity-opposite paths in the second detector 14. When these two paths are extended by one more bit, and the first detector bit $b_i$ is estimated to be 1 (as opposed to 0), then the circuit will either transition from a "swapped mapping" (feeding the result based on $select^{[0]}$ through $select^{[15]}$ into $Agree^{[1]}$) to an "unswapped mapping" (feeding that result into $Agree^{[0]}$ instead), or vice versa: it will transition from an unswapped mapping to a swapped mapping. On the other hand, if the first detector 12 bit $b_i$ is estimated to be 0 (as opposed to 1), then there is no change from a swapped to an unswapped mapping, or vice versa. In this way, a consistent association between the two parity-opposite paths in the second detector 14 path memory on the one hand and the two agreement delay lines on the other, is maintained.

If the signal $agree_i^{[0]}$ output by MUX 88 shown in FIG. 7 is 1, then a 1 is shifted into the top agreement delay line 54 shown in FIG. 5. Otherwise, the top agreement delay line 54 is reset to all 0s. The signal $agree_i^{[1]}$ output from MUX 89 shown in FIG. 7 controls the bottom agreement delay line 56 in exactly the same way. The effect is that each agreement delay line contains a block of 1's at its upstream end. The length of this block of 1's corresponds to the length of the match of a second detector 14 survivor path with the first detector 12 bit estimate. The two delay lines 54 and 56 correspond to the two survivor paths ending at the two states having path memory $b_{i-3}b_{i-2}b_{i-1}b_i$.

The circuit 50 described above with reference to FIG. 5 enforces both the merge-or-confident condition and the unmerged-path-agreement condition. In the case that the second detector 14 does not have party doubling, the circuits 50 and 80 shown in FIGS. 5 and 7, respectively, can be simplified because they can be designed to compute only the merged-or-confident condition. First, there may be only one delay line in the circuit 50, e.g., delay line 54 (delay line 56 omitted). Second, the value of $agree_i$ signal shown in FIG. 7 can be simply set to $c_{i-4}$, and the dependency of $agree_i$ signal on the second detector's select signals $select_{i[j]}$ can be completely eliminated. Thus, in some implementations, the circuit 80 shown in FIG. 7 can be entirely omitted.

To break up the long chain of AND gates 52 shown in FIG. 5 and to provide for a scalable version of the circuit 50, the following fact about merging of path memory may be used.

Fact 1. Assume that all rows of path memory agree in their estimates of the bits $$b_{i-3}, b_{i-2}, b_{i-1}, b_i.$$

In the case of parity doubling, further assume that all rows of path memory agree in their estimate of parity up to time i, $$\sum_{j=0}^{i} b_j.$$

Then all rows of path memory agree in their estimates of $b_j$, for all $j \leq i$.

Figure 8:
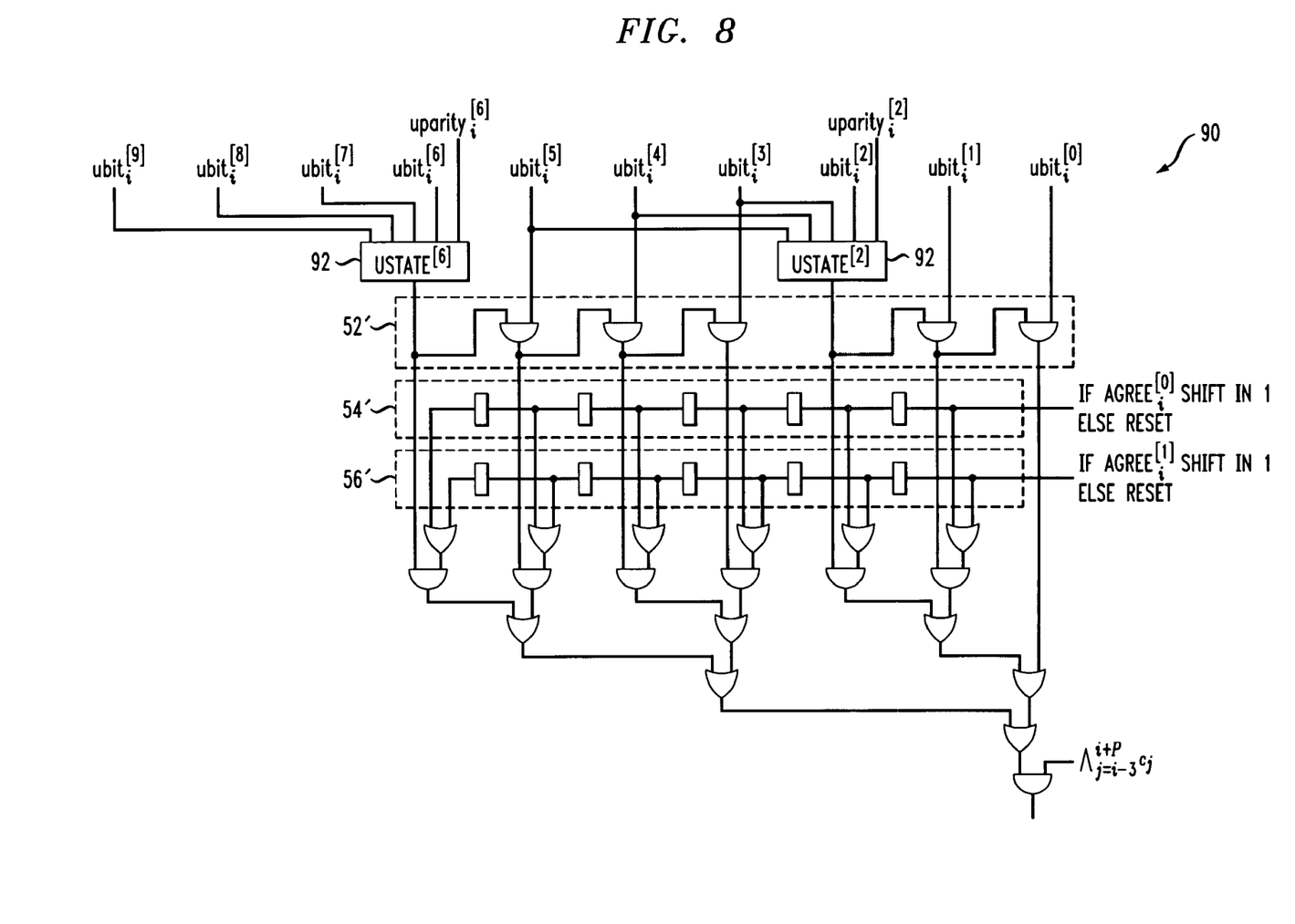
FIG. 8 illustrates a schematic diagram of a scalable version of the circuit shown in FIG. 5.

FIG. 8 depicts a circuit 90, which is a scalable version of the circuit 50 shown in FIG. 5. The circuit 90 is substantially similar to the circuit 50 with the exception of the differences described herein. In FIG. 8, the signal uparity$_i^{[j]}$ indicates whether or not all of the rows of the path memory at delay j agree in their estimate of the accumulated parity. More explicitly, if $b_i^{[j,k]}$ is the content of the path memory cell at lag j for state k at time i, then uparity$_i^{[j]}$ is 1 if and only if all of the 32 parity estimates $$\sum_{l=0}^{i} b_l^{[j,k]}, (0 \leq k \leq 31),$$

agree. The circuit 90 includes at least one ustate$^{[j]}$ block 92, which is preferably a 5-way AND gate. Using Fact 1 above, the ustate$^{[j]}$ block 92 can be used to break up the long chain of AND gates 52' because the output of the ustate$^{[j]}$ block 92 is equal to the conjunction $$ustate_i^{[j]} = \bigwedge_{j' \geq j} ubit_i^{[j']}$$

Notably, the long chain of AND gates 52' is broken up because the AND gates are connected in series, and any signal propagating through the AND gates would do so rather slowly. Thus, the ustate$^{[j]}$ block 92 saves processing time.

The modifications to the switch-on and switch-off circuits for a half-rate implementation will now be described. Instead of 5 full-rate cycles of pruning to force an initial state $$(b_{i-3} b_{i-2} b_{i-1} b_i, p),$$

3 half-rate cycles are used. In the first of these, the winning branch (or unpruned branch) into either state with path memory $$d_{i-1} d_i d_{i+1} d_{i+2}$$

has initial state with path memory $$b_{i-3} b_{i-2} d_{i-1} d_i$$

In the second cycle of pruning, the winning branch (or unpruned branch) into either state with path memory $$d_{i+1} d_{i+2} d_{i+3} d_{i+4}$$

has initial state with path memory $$b_{i-1} b_i d_{i+1} d_{i+2}$$

As before, the last cycle enforces the parity p of the initial state. But now, there are two unpruned branches remaining into the state $$(d_{i+3} d_{i+4} d_{i+5} d_{i+6}, q).$$

These are the two branches whose initial states $$(d_{i+1} d_{i+2} d_{i+3} d_{i+4}, q + d_{i+5} + d_{i+6})$$

satisfy $$p = q + \sum_{j=i+1}^{i+6} d_j$$

(It follows that the XOR $d_{i+1} + d_{i-2}$ is the same for the two surviving branches.)

As in the full-rate case, pruning for initial state obviates pruning for parity if pruning for parity would occur in any of these three cycles.

Figure 9:
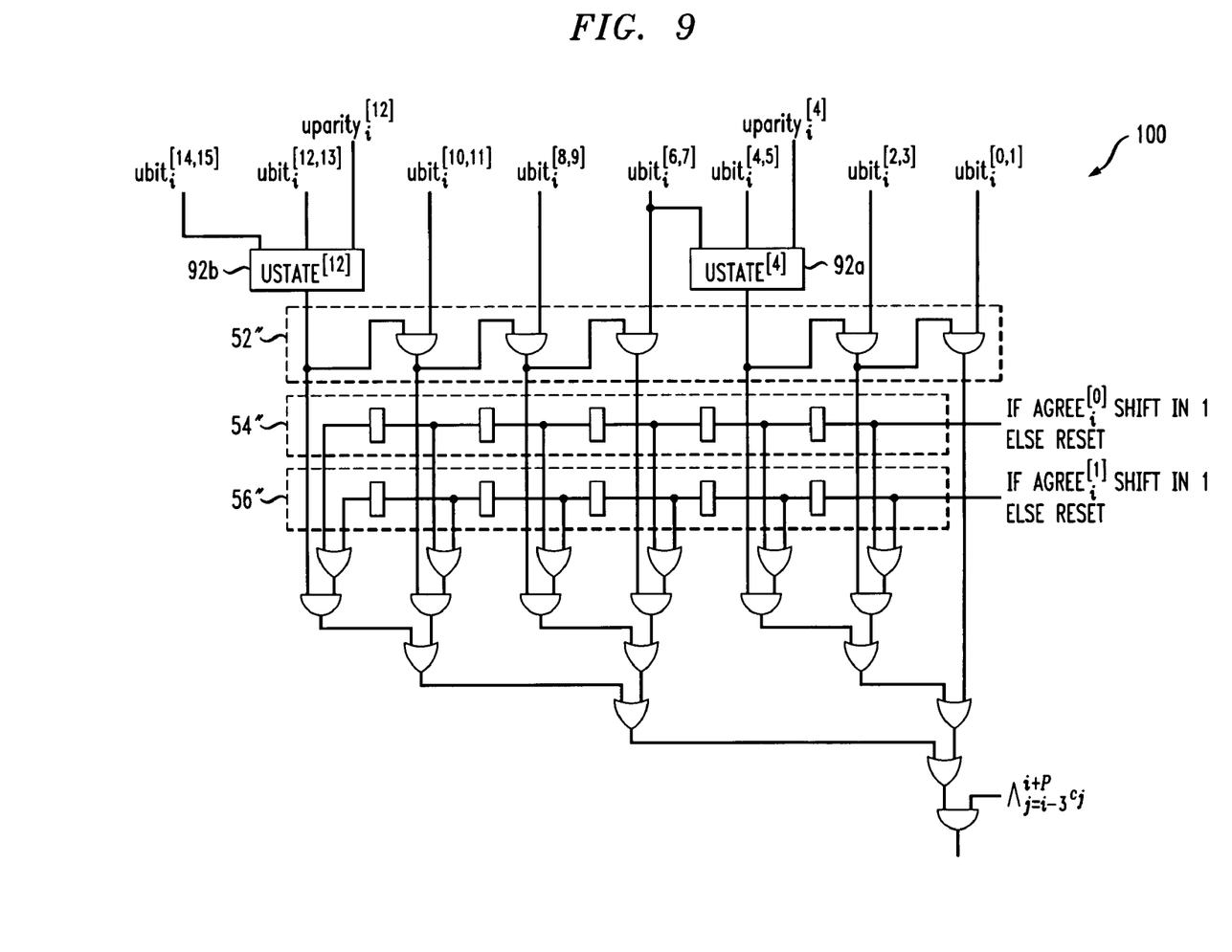
FIG. 9 illustrates a schematic diagram of a circuit for shutting down the second detector shown in FIG. 1 when the second detector is configured to operate on a half-rate clock cycle.

FIG. 9 depicts a circuit 100 that is a modified version of the full-rate second detector shutdown indicator circuit 90 shown in FIG. 8. The circuit 100 is substantially similar to the circuit 90 with the exception of the differences described herein. The signals ubit$_i^{[j,j+1]}$ indicate that the column of path memory storing the two bits at delays j and j+1 contains a unique two-bit value. Note that the agreement delay lines 54" and 56" operate at half-rate and are half as long as the full-rate version described above, although this simplification can also be applied to the full-rate version.

Figure 10:
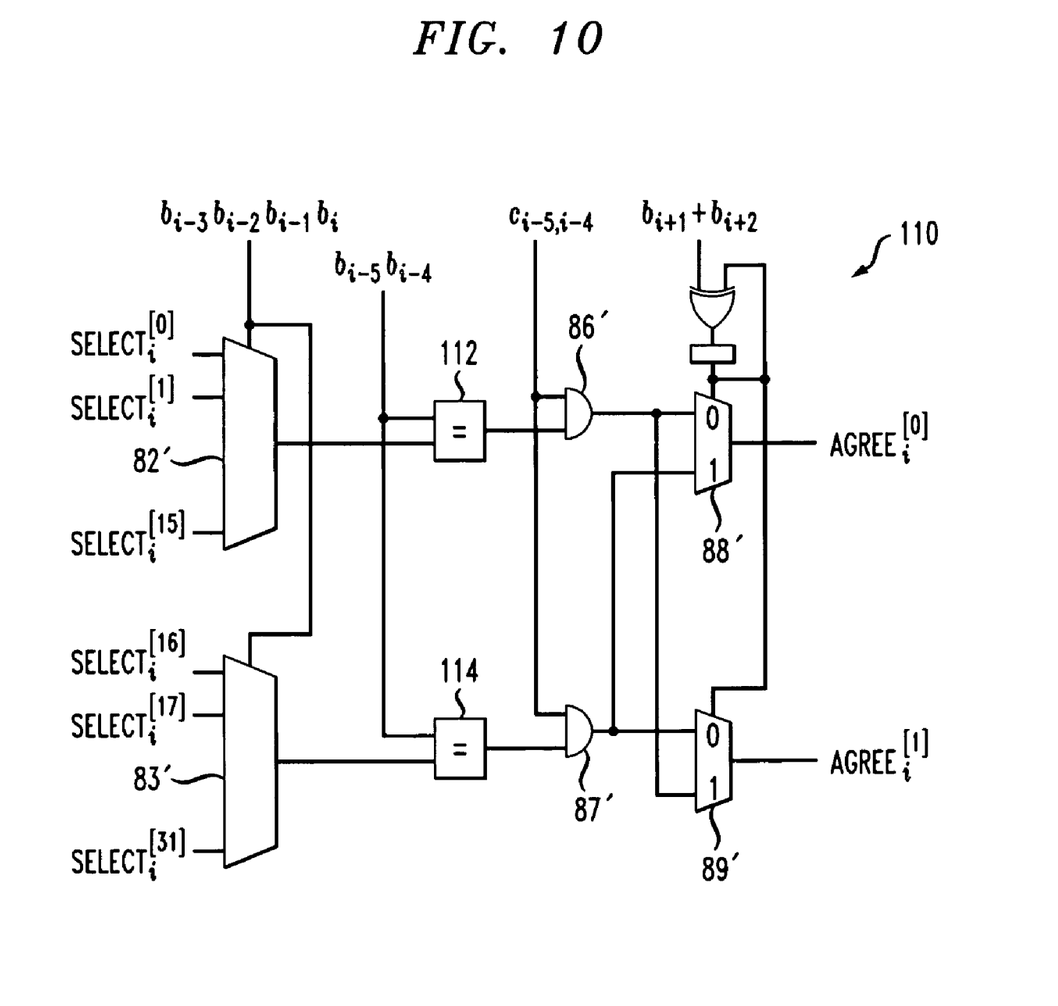
FIG. 10 illustrates a schematic diagram of a circuit for controlling the update of two agreement delay lines shown in FIG. 10 when the detector is configured to operate on a half-rate clock cycle.

FIG. 10 shows a circuit 110 that is a half-rate version of the agreement delay line control circuit 80 shown in FIG. 7. The circuit 110 is substantially similar to the circuit 80 with the exception of the differences described herein. Each select signal select$_i^{[j]}$ is 2 bits wide. The confidence signal $c_{i-5, i-4}$ can either be computed from the full-rate confidence signal as the conjunction $$c_{i-5, i-4} = c_{i-5} \wedge c_{i-4},$$

or it can be computed by thresholding soft information produced at half-rate by a SOVA detector that would be specialized to compute soft information for 2-bit blocks rather than bits. The circuit 110 also includes a pair of comparison logic elements 112 and 114. The elements 112 and 114 include logic that compares the input bits to one another. The inputs to the elements 112 and 114 are two bits wide just as each of the select signals inputted to the multiplexers 82' and 84' is two bits wide. Thus, the elements 112 and 114 serve to determine if the first two bits $b_{i-5} b_{i-4}$ inputted into the gate are equal to the two bits outputted from the multiplexer 82'. If the bits are equal, then the output of the elements 112 and 114 is 1; otherwise, the output is 0. Thus, the outputs of the elements 112 and 114 are just one bit wide, which conveys whether or not the $b_{i-5}$ and $b_{i-4}$ bits agree with the corresponding 2 bit select signal. In an exemplary configuration each element 112 and 114 can be implemented by using two parallel NXOR gates followed by an AND gate.

While the invention has been described with reference to preferred and example embodiments, it will be understood by those skilled in the art that a variety of modifications, additions and deletions are within the scope of the invention. For example, those skilled in the art will understand that the circuits described herein and depicted in the figures are exemplary and that various other configurations can be used to achieve the same functions.

What is claimed is:

1. A composite data detector comprising:
a first data detector, the first data detector receiving a sequence of bits, the first data detector being configured to generate hard bit estimates as to whether each bit in the sequence corresponds to a 1 or a 0 and to generate a respective confidence factor associated with each hard bit estimate, each confidence factor indicating whether or not the respective hard bit estimate is unreliable; and
a second data detector, the second data detector receiving said sequence of bits a predetermined delay period after the first data detector receives said sequence of bits, the second data detector responsive on a bit-by-bit decision basis to the hard bit estimates and the confidence factors generated by the first data detector, the second data detector being configured to process unreliable hard bit estimates in accordance with a branch metrics processing algorithm to generate new hard bit estimates, said second data detector being turned on a bit-by-bit decision basis when at least one of said confidence factors indicates that at least one respective hard bit estimate generated by the first data detector is unreliable, and wherein the second data detector is turned off on a bit-by-bit decision basis when the second data detector has generated new hard bit estimates for any unreliable bit estimates received by the second data detector.

2. The composite data detector of claim 1, wherein when the second data detector is turned on, the second data detector is in a known state, the known state being selected from a plurality of selectable states in response to the hard bit estimates provided by the first data detector prior to the second data detector being turned on.

3. The composite data detector of claim 2, wherein said known state is obtained by processing a particular number of reliable hard bit estimates generated by the first data detector prior to the second data detector processing the unreliable hard bit estimates in order to initialize the second data detector to said known state.

4. The composite data detector of claim 1, wherein the first data detector is a soft-output Viterbi (SOVA) detector.

5. The composite data detector of claim 1, wherein the second data detector is a hard output Viterbi detector.

6. A composite data detector comprising:
a first data detector, the first data detector receiving a sequence of bits, the first data detector being configured to generate hard bit estimates as to whether each bit in the sequence corresponds to a 1 or a 0 and to generate a respective confidence factor associated with each hard bit estimate, each confidence factor indicating whether or not the respective hard bit estimate is unreliable; and
a second data detector, the second data detector receiving said sequence of bits a predetermined delay period after the first data detector receives said sequence of bits, the second data detector responsive on a bit-by-bit decision basis to the hard bit estimates and the confidence factors generated by the first data detector, the second data detector being configured to process unreliable hard bit estimates in accordance with a branch metrics processing algorithm to generate new hard bit estimates, said second data detector being turned on a bit-by-bit decision basis when at least one of said confidence factors indicates that at least one respective hard bit estimate generated by the first data detector is unreliable, and wherein the second data detector is turned off on a bit-by-bit decision basis when the second data detector determines that one or more confidence factors received by the second data detector after the second data detector turned on indicate that one or more respective hard bit estimates generated by the first data detector are reliable so as to be used as final bit estimates in place of any hard bit estimates whose computation by the second detector is incomplete.

7. The composite data detector of claim 6, wherein when the second data detector is turned on, the second data detector is in a known state, the known state being selected from a plurality of selectable states in response to the hard bit estimates provided by the first data detector prior to the second data detector being turned on.

8. The composite data detector of claim 7, wherein said known state is obtained by processing a particular number of reliable hard bit estimates generated by the first data detector prior to the second data detector processing the unreliable hard bit estimates in order to initialize the second data detector to said known state.

9. The composite data detector of claim 6, wherein the first data detector is a soft-output Viterbi (SOVA) detector.

10. The composite data detector of claim 6, wherein the second data detector is a hard output Viterbi detector.

11. A method for detecting data comprising:
receiving a sequence of bits in a first data detector;
generating hard bit estimates as to whether each bit in the sequence corresponds to a 1 or a 0 in the first data detector;
generating a respective confidence factor associated with each hard bit estimate in the first data detector, each confidence factor indicating whether or not the respective hard bit estimate is unreliable;
receiving said sequence of bits in a second data detector a predetermined delay period after the first data detector receives said sequence of bits;
receiving the hard bit estimates and the confidence factors generated by the first data detector in the second data detector;
turning on said second data detector on a bit-by-bit decision basis when at least one of said confidence factors indicates that at least one respective hard bit estimate generated by the first data detector is unreliable,
processing unreliable hard bit estimates in the second data detector in accordance with a branch metrics processing algorithm to generate new hard bit estimates; and
turning off the second data detector on a bit-by-bit decision basis once the second data detector has generated new hard bit estimates for any unreliable bit estimates received by the second data detector.

12. The method of claim 11, wherein when the second data detector is turned on, the second data detector is in a known state, the known state being selected from a plurality of selectable states in response to the hard bit estimates provided by the first data detector prior to the second data detector being turned on.

13. The method of claim 12, further comprising:
prior to the second data detector processing unreliable hard bit estimates to generate new hard bit estimates, processing a particular number of reliable hard bit estimates generated by the first data detector in the second data detector in accordance with a branch metrics processing algorithm to initialize the second data detector to a known state.

14. The method of claim 11, wherein the first data detector is a soft-output Viterbi (SOVA) detector.

15. The method of claim 11, wherein the second data detector is a hard output Viterbi detector.

16. A method for detecting data comprising:
receiving a sequence of bits in a first data detector;
generating hard bit estimates as to whether each bit in the sequence corresponds to a 1 or a 0 in the first data detector;
generating a respective confidence factor associated with each hard bit estimate in the first data detector, each confidence factor indicating whether or not the respective hard bit estimate is unreliable;
receiving said sequence of bits in a second data detector a predetermined delay period after the first data detector receives said sequence of bits;
receiving the hard bit estimates and the confidence factors generated by the first data detector in the second data detector;
turning on said second data detector on a bit-by-bit decision basis when at least one of said confidence factors indicates that at least one respective hard bit estimate generated by the first data detector is unreliable,
processing unreliable hard bit estimates in the second data detector in accordance with a branch metrics processing algorithm to generate new hard bit estimates; and
turning off the second data detector on a bit-by-bit decision basis when the second data detector determines that one or more confidence factors received by the second data detector after the second data detector turned on indicate that one or more respective hard bit estimates generated by the first data detector are reliable so as to be used as final bit estimates in place of any hard bit estimates whose computation by the second detector is incomplete.

17. The method of claim 16, wherein when the second data detector is turned on, the second data detector is in a known state, the known state being selected from a plurality of selectable states in response to the hard bit estimates provided by the first data detector prior to the second data detector being turned on.

18. The method of claim 16, further comprising:
prior to the second data detector processing unreliable hard bit estimates to generate new hard bit estimates, processing a particular number of reliable hard bit estimates generated by the first data detector in the second data detector in accordance with a branch metrics processing algorithm to initialize the second data detector to a known state.

19. The method of claim 16, wherein the first data detector is a soft-output Viterbi (SOVA) detector.

20. The method of claim 16, wherein the second data detector is a hard output Viterbi detector.

* * * * *